United States Patent

Webb et al.

[11] Patent Number: 5,772,257
[45] Date of Patent: Jun. 30, 1998

[54] PIPE COUPLING

[75] Inventors: Ian Richard Webb, Buckinghamshire; William Taylor, Middlesex; Neil John Thornton Taylor, Hertfordshire, all of United Kingdom

[73] Assignee: Taylor Kerr (Couplings) Limited, London, United Kingdom

[21] Appl. No.: 635,920
[22] PCT Filed: Oct. 24, 1994
[86] PCT No.: PCT/GB94/02329
§ 371 Date: Jun. 3, 1996
§ 102(e) Date: Jun. 3, 1996
[87] PCT Pub. No.: WO95/11402
PCT Pub. Date: Apr. 27, 1995

[30] Foreign Application Priority Data

Oct. 22, 1993 [GB] United Kingdom ............... 9321834

[51] Int. Cl.⁶ ............................................... F16L 17/04
[52] U.S. Cl. .......................... 285/112; 285/373; 285/423; 285/906
[58] Field of Search .................................. 285/105, 373, 285/112, 423, 906

[56] References Cited

U.S. PATENT DOCUMENTS

| 3,185,504 | 5/1965 | Perrot et al. ........................... 285/105 |
| 3,454,287 | 7/1969 | Thiessen ............................ 285/373 X |
| 3,801,141 | 4/1974 | Hollingsworth . | |
| 3,851,901 | 12/1974 | Sills . | |
| 3,877,733 | 4/1975 | Straub . | |
| 4,108,479 | 8/1978 | Straub . | |
| 4,119,333 | 10/1978 | Straub . | |
| 4,518,177 | 5/1985 | Deakins . | |
| 4,627,645 | 12/1986 | Sauer . | |
| 4,629,217 | 12/1986 | Straub ............................... 285/373 X |
| 5,280,970 | 1/1994 | Straub . | |
| 5,351,997 | 10/1994 | Webb et al. . | |

FOREIGN PATENT DOCUMENTS

| 572399 | 5/1988 | Australia . |
| 580436 | 1/1989 | Australia . |
| 594113 | 5/1959 | Italy ...................................... 285/105 |
| 6406152 | 1/1965 | Netherlands ........................ 285/105 |
| 2167145 | 5/1986 | United Kingdom . |

Primary Examiner—Dave W. Arola
Attorney, Agent, or Firm—Flynn, Thiel, Boutell & Tanis, P.C.

[57] ABSTRACT

A pipe coupling 1 for connecting together two pipes in a fluid-tight manner comprising an outer tubular casing 10, an inner tubular casing 20 and a tubular sealing sleeve 30. The sealing sleeve 30 has two sets of inwardly projecting ribs 32, which in use, are pressed into sealing engagement with the respective ends of the pipes. The inner and outer casings are longitudinally split and tensioning screws 17 on the outer casing can be tightened to tighten the outer casing around the inner casing and the sealing sleeve. Frusto-conical gripping rings 40 grip the pipes by engaging radial abutment surfaces facing away from the pipe ends and positioned close to the ends of said pipes in order to secure the pipes against axial displacement.

19 Claims, 5 Drawing Sheets

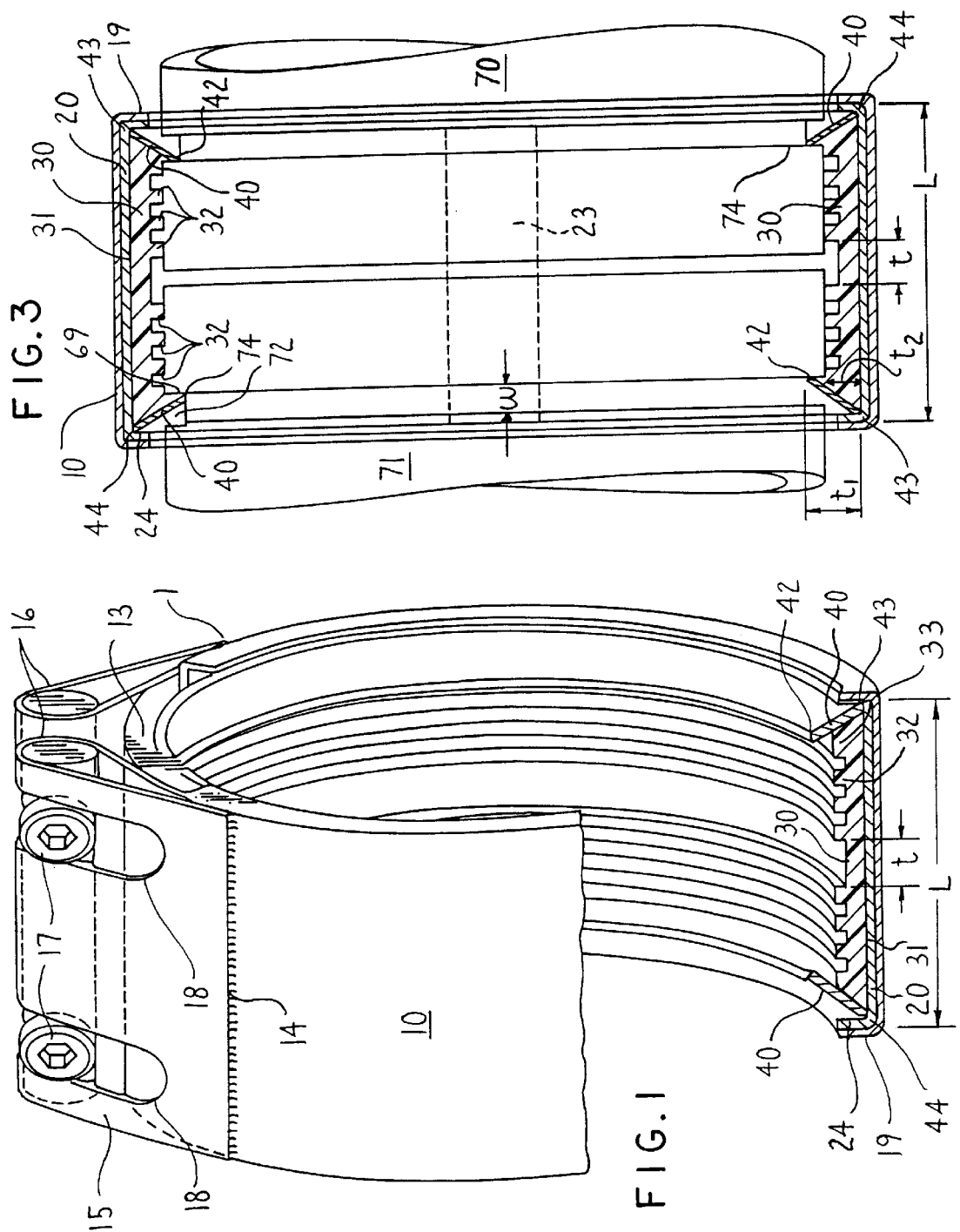

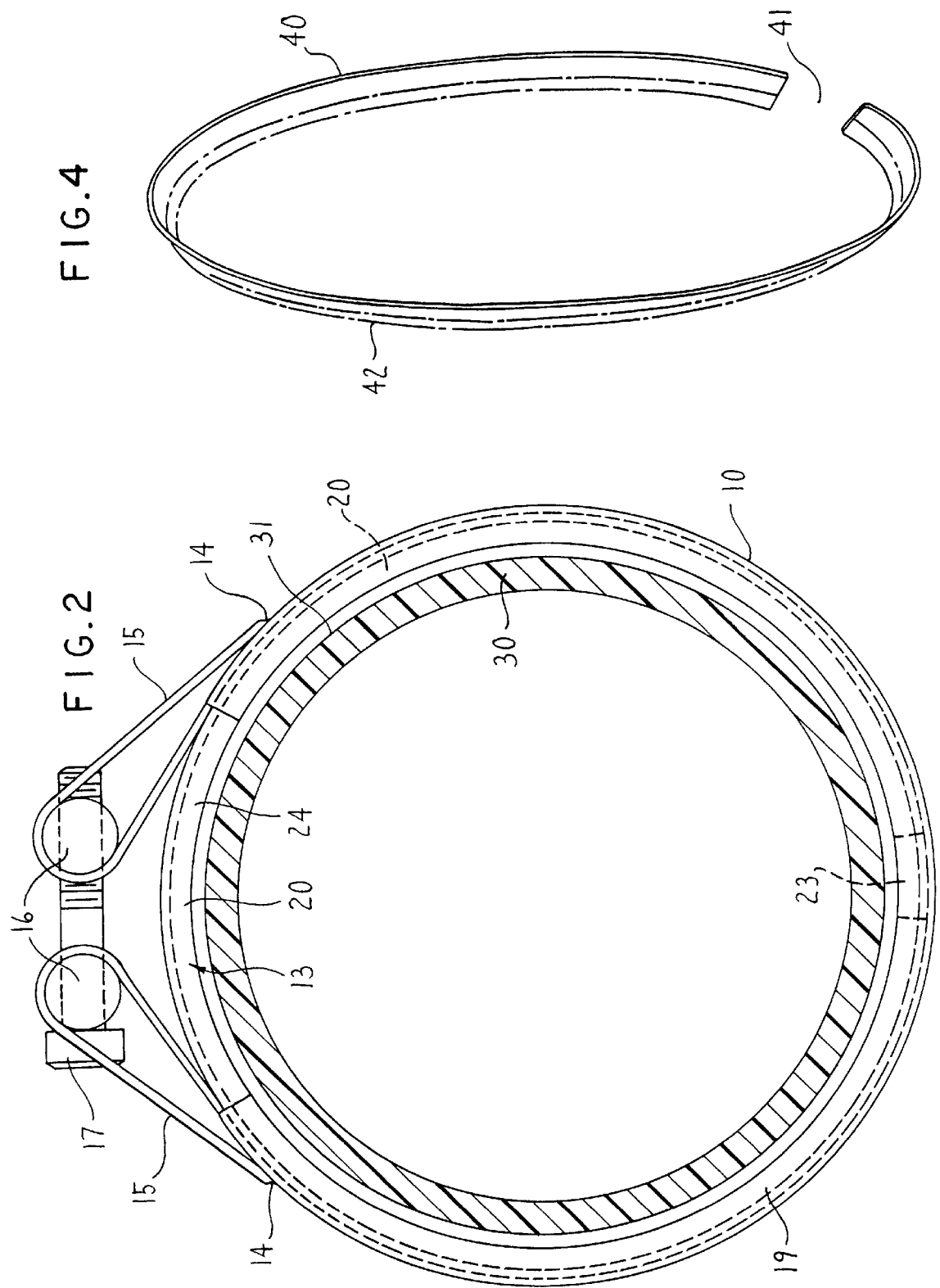

PIPE COUPLING

FIELD OF THE INVENTION

The present invention relates to pipe couplings for connecting together two pipes in a fluid-tight manner of the type comprising a tubular casing formed with a longitudinal gap, a sealing sleeve of resilient flexible material arranged within the casing, and tensioning means for reducing the width of the longitudinal gap. In use, the sealing sleeve is placed around the adjacent pipe ends and the tensioning means are tightened to clamp the sleeve against the outer surfaces of the pipe ends to form a fluid tight seal.

BACKGROUND OF THE INVENTION

In some applications pipe couplings have to be able to withstand enormous axial forces produced by the hydrostatic pressure within the pipeline. These forces may typically produce a load of the order of 15 tons. It is difficult to construct a coupling that can reliably withstand such forces.

In our patent application GB-A-2,249,366A we described a pipe coupling for connecting together two plain-ended pipes in a Fluid-tight manner comprising of a tubular casing, a tubular sealing sleeve, and tensioning means for tightening the casing about the sealing sleeve. At each end the sealing sleeve has a circumferential slot in its outer surface and a gripping ring with inwardly projecting gipping teeth is located in each slot. Tightening the tensioning means causes the sealing sleeve to be pressed into sealing engagement with the pipe ends and the gripping teeth of the gripping rings to penetrate the bottoms of the slots and to engage the outer surfaces of the pipe ends.

The gripping teeth bite into the surface of the pipe to provide an anchoring effect against the axial loads.

There are applications for pipe couplings where the coupling has to withstand high axial loads and where the pipes are made of relatively soft material such as plastics or glass fibres. Such materials may not be sufficiently strong to withstand the pressure of the gripping teeth and may be displaced under large axial load allowing the teeth to slip and thus provide unsatisfactory anchoring of the pipe to the coupling.

SUMMARY OF THE INVENTION

The objects and purposes of the invention include overcoming the disadvantages of the above-discussed prior art.

The present invention in a first aspect provides a pipe coupling for connecting in a fluid-tight manner to the end of a pipe. The pipe has a radial abutment surface facing away from the pipe end on its outer surface. The coupling includes a tubular casing, a tubular sealing sleeve, tensioning means for tightening the casing about the sealing sleeve and a frustoconical gripping ring located within the tubular casing at the end of the sealing sleeve. The arrangement is such that, in use, tightening the tensioning means causes the sealing sleeve to be pressed into sealing engagement with the outer surface of the pipe ends. The tubular casing has a tubular web portion and a radially projecting flange at one end of the web portion, and the outer surface of the gripping ring makes contact with the angle or corner between the flange and web of the tubular casing. The inner surface of the gripping ring is plain and smooth and projects inwardly beyond the inner surface of the sealing sleeve when the casing is tightened around the sleeve whereby, in use, when the coupling is fitted around the pipe end, the inner surface of the sealing sleeve engages the outer surface of the pipe end and the inner surface of the gripping ring engages the abutment surface. When the pipe and coupling are placed under axial tension, the ring between the pipe and the coupling is placed under compression between the angle or corner in the tubular casing and the angle or corner at the bottom of the abutment surface.

The present invention in a second aspect provides an assembly of a pipe coupling connected in a fluid-tight manner to the end of a pipe. The pipe has a radial abutment surface facing away from the pipe end on its outer surface. The coupling comprises a tubular casing, a tubular sealing sleeve, tensioning means for tightening the casing about the sealing sleeve and a frusto-conical gripping ring located within the tubular casing at the end of the sealing sleeve. The arrangement is such that, in use, tightening the tensioning means causes the sealing sleeve to be pressed into sealing engagement with the outer surface of the pipe end. The tubular casing has a tubular web portion and a radially projecting flange at one end of the web portion, and the outer surface of the gripping ring makes contact with the angle between the flange and web of the tubular casing. The inner surface of the gripping ring is plain and smooth and makes contact with the abutment surface, whereby, when the assembly is placed under axial tension, the ring is placed under compression between the angle or corner in the tubular casing and the angle or corner at the inner edge of the radial abutment surface.

We have discovered that by replacing the toothed gripping ring of our previous coupling with a simple frusto-conical gripping ring with a plain inner edge, and by providing a radial abutment surface generally orthogonal to the pipe's cylindrical surface and facing away from the pipe's end, for example by forming a shoulder on or by machining a groove in the outer surface of the pipe near its end to receive the gripping ring, a satisfactory anchoring of the pipe against axial loads can be achieved with pipes of all types of material even soft material such as plastics or glass fibre. The radial depth of the abutment surface may be varied to suit the pipe material or the application. For example when using plastic pipes with an abutment surface provided by one side of a groove of 3 mm depth, the coupling has been able to withstand an axial load of up to 15 tons.

Where the abutment surface is provided by one side of a groove and it is desired to allow the pipe coupling to accommodate large amounts of expansion and contraction, the groove may be made wider than is necessary merely to accommodate the ring so that the ring can slide axially relative to the groove as the pipe expands and contracts.

This invention will work equally well irrespective of whether the axial thrust is generated by internal hydrostatic pressure or by the influence of an external force when the pipe is empty or not under pressure.

Preferably, a gripping ring is provided at each end of the coupling. The gripping ring is preferably frusto-conical, may be formed from sheet material, and is an incomplete ring so that it can easily be expanded and compressed.

Preferably, the casing has an inwardly projecting flange at each end and the gripping rings are located with their outer edges in the angles between the tubular portion of the casing and the flanges.

The tubular casing preferably comprises an inner casing and an outer casing. The inner casing fits within the outer casing. The inner casing and the outer casing both have longitudinal gaps and the gap in the inner casing is offset circumferentially from the gap in the outer casing so that the sealing sleeve is supported around its entire periphery either by the inner casing, or the outer casing, or both casings.

Both the inner and outer casing may have their axial end margins bent inwardly to form radial flanges.

BRIEF DESCRIPTION OF THE DRAWINGS

An embodiment of the invention will now be described, by way of example, with reference to the accompanying drawings, of which:

FIG. 1 shows a perspective cut-away view of a coupling in accordance with the invention;

FIG. 2 shows an end view of the coupling of FIG. 1;

FIG. 3 shows a longitudinal section through the coupling of FIG. 1;

FIG. 4 shows a perspective view of gripping ring of the coupling of FIGS. 1 to 3;

DETAILED DESCRIPTION

Figure 5:
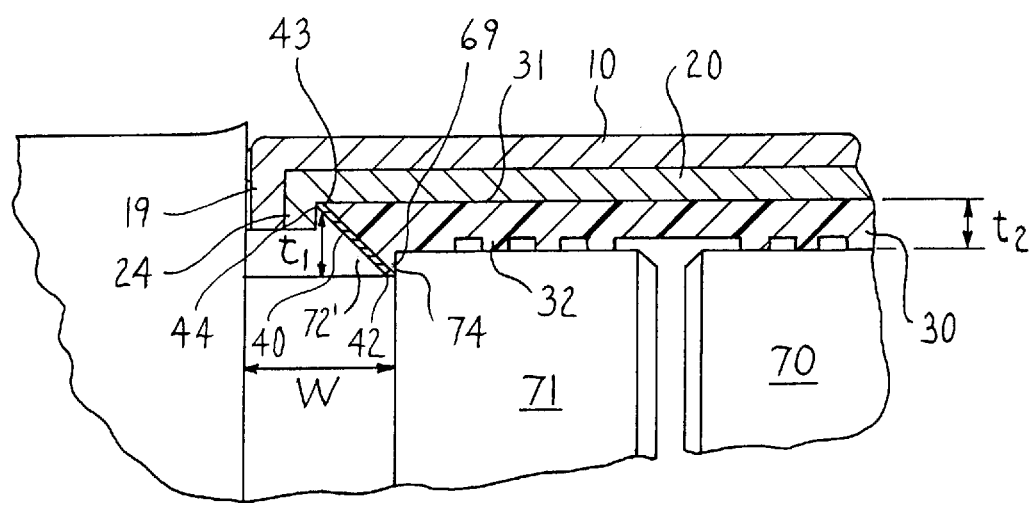
FIG. 5 shows a longitudinal section through the assembly of the coupling connected to a different form of pipe.

A pipe coupling 1 comprises an outer tubular casing 10 an inner tubular casing 20 and a sealing gasket 30. The outer tubular casing 10 is formed of steel by rolling or stamping, with a longitudinal gap 13. The casing 10 is folded back on itself at its free ends and welded at 14 to form loops 15 along opposite edges of the longitudinal gap 13. Pins 16 are inserted in the loops 15. Tensioning screws 17 pass through transverse holes in one of the pins 16 into tapped transverse holes in the other of the pins 16, so as to interconnect the two free ends of the outer casing 10. Slots 18 are cut in the loops 15 so as to provide clearance for the screws 17. The axial end margins of the casing 10 are bent inwardly at right angles to form radial-flanges 19.

The inner tubular casing 20 is manufactured of steel by rolling or stamping and has a longitudinal gap 23. The end margins of the casing 20 are bent inwardly at right angles to form radial flanges 24. The casing 20 fits inside the outer casing 10, the axial length of the casing 20 being slightly less than that of the casing 10 so that the flanges 24 fit inside and, in use, are supported laterally by the flanges 19.

The sealing gasket 30 is typically formed of robber from a length of flat extrusion which is rolled into a tube and joined by welding to form a complete cylinder. Alternatively, the rubber gasket may be moulded. The outer surface 31 of the gasket 30 is smooth but the inner surface is formed with two sets of annular sealing ribs 32 which project inwardly and have a square profile. In the present embodiment there are three ribs in each set. Towards each end of the gasket 30 the inner surface is stepped inwardly to form bands 33. The invention is not restricted to having any particular type of sealing gasket; the gasket may alternatively be based on that of our UK patent number GB 2,180,311B wherein pressure sensitive sealing lips are employed.

A gripping device is provided at each end of the casing 10. Each device comprises a frusto-conical ring 40 made from hard sheet steel. The rings are incomplete and have radial gaps 41 so that they are of adjustable diameter. Each ring 40 has a smooth inner surface formed by the inner edge 42 and a smooth outer surface formed by the outer edge 43.

The frusto-conical ring 40 has a slope of approximately 40°–50°. The ends of the gasket 30 slope inwardly in a reentrant manner at a similar angle. The rings 40 are located against the sloping ends of the gasket 30 and are held in position by the inwardly projecting flanges 19 and 24 of the casing, the outer edges 43 of the rings 40 sit ting in the angles or corners 44 between or formed by the inwardly projecting flanges 24 and the axial-extending web portion of the casing 20. The ring 40 is arranged with its smaller diameter end 42 facing into the coupling.

The radial distance $t_1$, between the inner edge 42 and the outer edge 43 of the ring 40, measured in a direction orthogonal to the axis of the coupling, is greater than the thickness $t_2$ of the gasket 30, so that the inner edge 42 of the ring 40 projects inwardly beyond the inner surface of the gasket 30. The casing, gasket and rings can he assembled as a sub-assembly prior to mounting on the pipes. This makes the coupling convenient to use in the field as there are no loose parts which might get mislaid.

Two pipes 70 and 71 each have an abutment surface 69 provided at one side of a groove 72 machined in their outer surfaces near the end of the pipes. Typically the grooves are 3 mm deem and have square sides.

In use the ends of the two pipes 70 and 71 are inserted into the coupling from opposite ends as shown in FIG. 3. A space of say 10 mm may be left between the pipe ends to allow for angular deflection, or to avoid abrasive wear, or to dampen vibration. With the coupling in place, the screws 17 are tightened to clamp the coupling to the pipes 70,71. The pipes 70,71 are located so that the gripping rings 40 are aligned with the grooves 72. As the screws 17 are tightened, the loops 15 of the outer casing 10 are drawn together, thereby applying a radially compressive force to the outer casing 10. The inner casing 10 is arranged so that its longitudinal gap 23 is diametrically opposite the longitudinal gap 13 in the outer casing 10. In this way the inner casing 10 supports the gasket 30 in the region of the gap 13 where there is no support from the outer casing 10. The inner casing 20 is dimensioned so that when the coupling is tightened around the pipe ends, then only a small longitudinal gap 23 remains.

The tightening of the tensioning screws 17 presses the annular sealing ribs 32 into sealing contact with the outer surfaces of the pipe ends, the sealing ribs 32 deforming easily due to their height, width and the grade of material used. At the same time, the gripping ring 40 is pushed inwardly by the angle or corner 44 of the inner casing 20 gripping the outer edge 43 of the ring 40. The compression of the gripping ring 40 causes the inner edges 40 of the rings 40 to be pressed into their respective grooves 72 in the pipes 70 and 71 until they make contact with the bottoms of the grooves 72. When axial loads are applied to the pipes 70,71 tending to pull them apart, the inner edges 42 of the rings 40 may contact the angles or corners 74 between the bottoms of the grooves 72 and the sides of the grooves 72 facing away from the pipe ends that form the abutment surfaces 69. The rings 40 are placed in compression between the angles or corners 44 and 74.

The coupling described above has the advantage over the coupling described in our earlier patent specification No. GB-A-2,249,366A, in that it is especially well suited to pipes of relatively soft plastics or glass fibre materials that would not provide secure anchorage for the toothed ring. The abutment surface 69 provided by one side of grooves 72 provide a secure seating for the gripping rings 40. We have found that with an abutment surface of 3 mm radial depth on a 400 mm diameter pipe, the coupling can be made to withstand an axial load of 15 tons.

The casing of the coupling of the present invention can be of lighter, construction than the cast iron casing of some conventional couplings. For example, with a coupling for joining together two pipes of around 400 mm in diameter, (approximately 16 inches), the thickness of the outer casing 10 can be approximately 3 mm, and the thickness of the inner casing 20 approximately 2.5 mm. An advantage of using thinner metal is that the machinery required to form the casings is less expensive.

The arrangement for holding the gripping rings 40 is of simple construction and apart from the casings 15, 20 and the gasket 30, involves no separate parts. The entire structure is accommodated within the two pairs of annular flanges 19 and 24 which gives the total structure great strength and stability.

Because of the resilience in the gripping ring 40 and the rubber, the clamping arrangement releases itself when the coupling is released. The gripping rings 40 should be so constructed that in their natural relaxed condition the inner diameter of the rings 40 is greater than the outside diameter of the pipe end.

The ring 40 is able to find its own settlement. The outer-edge 43 is located in the angle between the flange 24 and web portions of the inner casing 20, and the position of the inner edge 42 is located in the angle or corner 74 formed between the abutment surface 69 and the bottom of the groove 72. The angle of approximately 45° which is established between the ring 40, and the pipe surface when the ring 40 first engages the abutment surface 69 is maintained as the coupling is tightened. The angle or corner in the inner casing 20 bears directly against the outer edge 43 of the gripping ring 40.

Because the ring 40 bears against the angle or corner 44 in the inner casing, the reaction forces from the ring 40 can be spread through the surface of the inner casing 20 to the outer casing 10.

Although the invention has been described in relation to a coupling for joining pipes of equal diameter it will be appreciated that it can be modified to form a stepped coupling of asymmetric configuration for joining pipes of unequal diameter.

In such a stepped coupling the outer and inner casings would be constructed to extend deeper on the side of the smaller pipe. The gasket would be radially thicker on the side of the smaller pipe, and include a slot, as described above, into which a ring could be fitted. In one form of construction of a stepped coupling, the radial thickness (i.e. the radial dimension from the outer periphery to the inner periphery) of the ring on the side of the smaller pipe could be greater than that of the other ring.

Alternatively, the radial thickness of the rings could be the same, the overall diameter of the ring on the side of the smaller pipe being less than that of the other ring. In this form of construction, the thickness of the inner casing would be increased, on the side of the smaller pipe, so that the respective ring would bear against a portion of the inner casing.

In the embodiment of FIG. 3, the pipes are shown to be of straight cylindrical form. The invention is also applicable to pipes with shaped ends such as that shown in FIG. 6. The pipe is flared towards its end to form a shoulder 76 before terminating in a cylindrical portion 77. A groove 72' can be formed by a machining or otherwise in the outer surface of the cylindrical portion 77 adjacent the shoulder.

Figure 6:
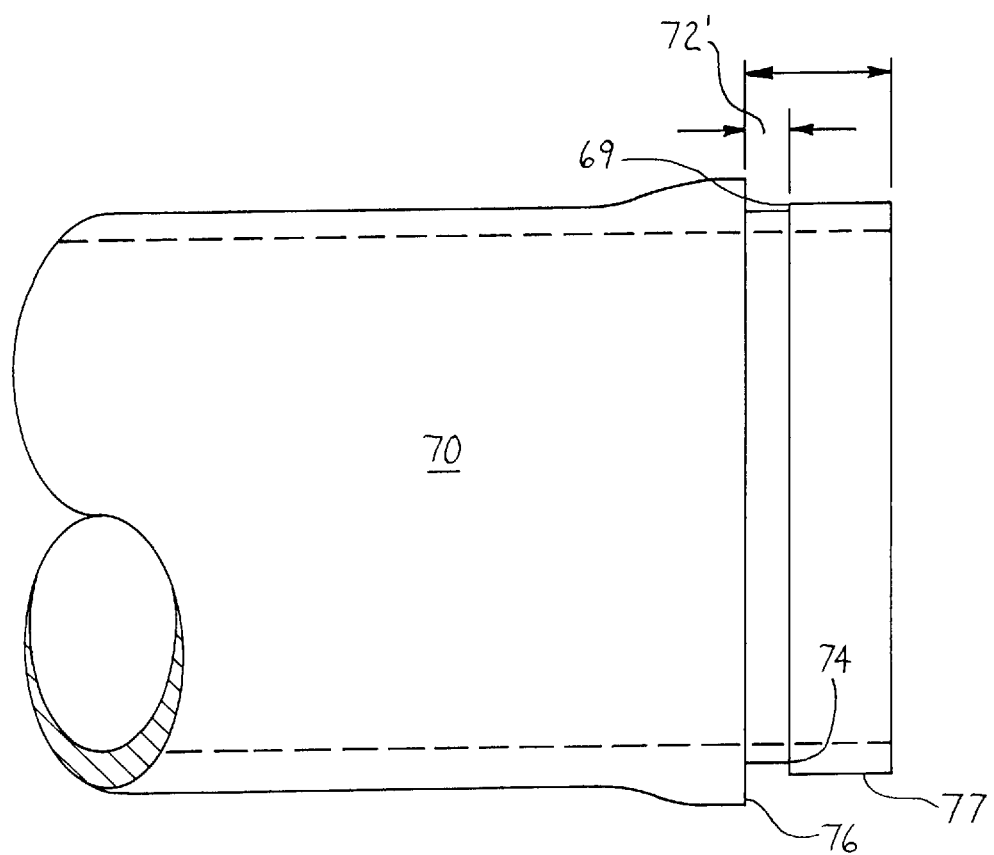
FIG. 6 shows a side view of the pipe end of FIG. 5.

When the coupling is used for connecting pipes with ends as shown in FIG. 6, the radially inwardly projecting flange 19 of the outer casing 10 of the coupling is positioned so that it abuts the shoulder 76 as shown in FIG. 5.

The width of the groove 72' is such that when the assembly of coupling and pipe is under axial compression the flange 19 may abut the shoulder 76 that forms the side of the groove 72' furthest from the end of the pipe and the inner edge 42 of the ring engages the bottom of the groove 72' away from the angle or corner 74 between the bottom and side walls. When the coupling and pipe are under axial tension, the outer edge 43 of the gripping ring 40 remains in contact with the axially-extending angle or corner 44 between the web portion and the radially inwardly projecting flange 24 of the inner casing 20, and the inner edge 42 of the ring 40 moves in the groove 72' to make contact with the angle or corner 74 between the bottom of the groove 72' and the side of the groove 72' adjacent the end of the pipe thus limiting the axial displacement of the pipe end with respect to the coupling. In this way the coupling can accommodate axial expansion and contraction of the pipe.

Figure 7:
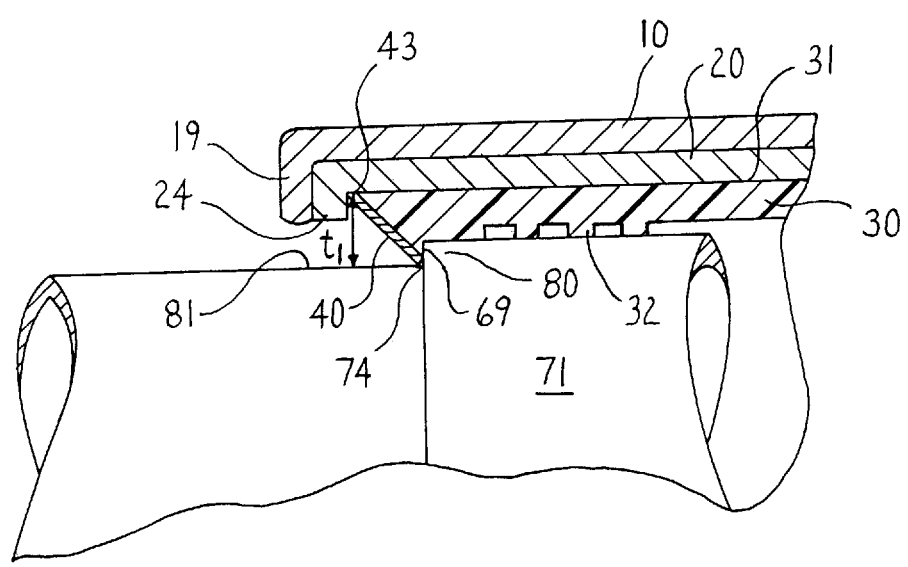
FIG. 7 shows a side view of a pipe having an abutment surface formed by a shoulder near its end.

Although the coupling is particularly useful with plastics or glass fibre pipes, it can be used with pipes of other materials such as concrete, iron or steel. Although the abutment surface provided by one side of a groove is machined in the pipe near its end in the embodiment described above, it may alternatively be formed by moulding during the manufacturing process. FIG. 7 shows an alternative type of abutment surface provided by a shoulder 80. This shoulder 80 may be added to the pipe near its end before the coupling is used or alternatively it may be formed on the external surface of the pipe during the pipe manufacturing process. The inner surface of the gripping ring 40 engages the angle or corner formed between the radial abutment surface 69 formed by the shoulder 80 and the cylindrical surface 81 formed by the outer surface of the pipe adjacent the radially inner edge of the abutment surface 69. In other aspects the arrangements of FIG. 7 can be identical to the arrangement of FIGS. 1 to 5.

Although a particular preferred embodiment of the invention has been disclosed in detail for illustrative purposes, it will be recognized that variations or modifications of the disclosed apparatus, including the rearrangement of parts, lie within the scope of the present invention.

We claim:

1. A pipe coupling for connection in a fluid-tight manner to an end of a pipe having a radial abutment surface facing away from the pipe end on an outer surface thereof, the pipe having an additional surface adjoining a radially inner edge of the abutment surface to form a corner therebetween, said coupling comprising:

a tubular casing;

a tubular sealing sleeve disposed within the casing;

tensioning means for tightening the said casing about said sealing sleeve; and a frusto-conical gripping ring located within said tubular casing at an end of said sealing sleeve, the arrangement being such that, in use, tightening the tensioning means causes the sealing sleeve to be pressed into sealing engagement with the outer surface of the pipe end;

said tubular casing comprising a tubular web portion and a radially inwardly projecting flange at an end of said web portion, said flange and said web portion being disposed to form a corner therebetween;

said gripping ring having an inner edge and an outer edge, the outer edge of the gripping ring making contact with said corner formed between the flange and web portion of the tubular casing;

the inner edge of the gripping ring being plain and smooth and projecting inwardly beyond an inner surface of the sealing sleeve when the casing is tightened around the sleeve;

the inner surface of the sealing sleeve being configured and disposed to engage the outer surface of the pipe end, and the inner edge of the gripping ring being configured and disposed to engage the abutment surface upon the coupling being fitted around the pipe end; and the gripping ring disposed between the pipe and the coupling being compressed between the corner formed in the tubular casing and the corner formed at the radially inner edge of the abutment surface upon the pipe and coupling being under axial tension.

2. A coupling according to claim 1 for connecting together two pipes, each pipe having a radial abutment surface on its outer surface, said coupling including a gripping ring at each of its ends.

3. A coupling according to claim 1 in which the casing has two ends and has an inwardly-projecting flange at each end, a corner being formed between the web portion and each inwardly protecting flange, and gripping rings being located with their outer edges in the corners formed between the tubular web portion of the casing and the flanges.

4. A coupling according to claim 1, in which the gripping ring extends in a direction measured orthogonal to the axis of the coupling greater than a thickness of the sealing sleeve.

5. A coupling according to claim 1 in which the gripping ring comprises a diameter and a radial gap, said radial gap being disposed and configured for permitting adjustment of said diameter.

6. A coupling according to claim 1 in which the gripping ring is formed from sheet material.

7. A coupling according to claim 1 in which the outer edge of the gripping ring forms an outer surface of the ring which is in contact with the said corner formed between the flange and web portion of the casing, the inner edge of the gripping ring forming an inner surface of the gripping ring and facing into the coupling.

8. A coupling according to claim 1 in which the tubular casing comprises an inner casing and an outer casing, the inner casing fitting within the outer casing.

9. A coupling according to claim 8 wherein:

the sealing sleeve has a periphery; and the inner casing and the outer casing both have longitudinal gaps, the gap in the inner casing being offset circumferentially from the gap in the outer casing so that the sealing sleeve is supported around its entire periphery by at least one of: the inner casing and the outer casing.

10. A coupling according to claim 8 wherein:

said inner casing comprises:

an end disposed adjacent said gripping ring;

said flange, said flange comprising a radially inwardly bent portion of said end of said inner casing;

said outer casing comprises:

an end disposed adjacent said end of said inner casing; and a flange, said flange of said outer portion engaging said flange of said inner portion and comprising a radially inwardly bent portion of said end of said outer casing.

11. An assembly of a pipe coupling connected in a fluid-tight manner to an end of a pipe, the pipe having an outer surface which includes a radial abutment surface facing away from the pipe end, the outer surface including an additional surface adjoining a radially inner edge of the radial abutment surface to form a corner therebetween, said coupling comprising:

a tubular casing;

a tubular sealing sleeve;

tensioning means for tightening said casing about said sealing sleeve; and a frusto-conical gripping ring located within the tubular casing at an end of the sealing sleeve, whereby tightening the tensioning means causes the sealing sleeve to be pressed into sealing engagement with the pipe end;

said tubular casing comprising a tubular web portion and a radially inwardly projecting flange at an end of said web portion, said flange and said web portion being disposed to form a corner therebetween;

said gripping ring having an inner edge and an outer edge;

the outer edge of the gripping ring making contact with said corner formed between the flange and web portion of the tubular casing;

the inner edge of the gripping ring being plain and smooth and making contact with the abutment surface, the gripping ring being compressed between said corner formed in the tubular casing and said corner formed at the inner edge of the radial abutment surface upon the assembly being placed under axial tension.

12. An assembly according to claim 11 wherein the abutment surface makes an angle no greater than 90° with a cylindrical surface of the pipe adjacent the radially inner edge of the abutment surface.

13. An assembly according to claim 11 wherein the abutment surface has a radial depth of approximately 3 mm.

14. An assembly according to claim 11, said assembly being configured for connecting together more than one pipe each having a radial abutment surface facing away from the pipe end on the outer surface, the coupling having two ends and a gripping ring at each of the ends of the coupling.

15. An assembly according to claim 11 wherein the flange of the casing abuts the side of a groove in the outer surface of the pipe furthest from the end of the pipe.

16. An assembly according to claim 11 in which the radial abutment surface is provided by one side of a groove.

17. A pipe coupling for connecting in a fluid-tight manner to an end of a pipe having an annular groove in an outer surface thereof, the annular groove having a bottom and a side disposed to form a corner therebetween, the corner being disposed adjacent the end of the pipe said coupling comprising:

a tubular casing;

a tubular sealing sleeve disposed within said casing;

tensioning means for tightening said casing about said sealing sleeve; and a frusto-conical gripping ring located within said tubular casing at an end of said sealing sleeve so that tightening the tensioning means causes the sealing sleeve to be pressed into sealing engagement with the pipe end;

said tubular casing comprising a tubular web portion and a radially inwardly projecting flange at an end of said web portion, said flange and said tubular web portion being disposed to form a corner therebetween;

said gripping ring having an inner edge and an outer edge, the outer edge of the gripping ring making contact with the corner formed between the flange and web portion of the tubular casing;

the inner edge of the gripping ring being plain and smooth and protecting radially inwardly further than an inner surface of the sealing sleeve for engagement in the groove adjacent the end of the pipe;

the gripping ring disposed between the pipe and the coupling being compressed between said corner in the tubular casing and said corner in the groove upon the coupling being under axial tension.

18. An assembly of a pipe coupling and a pipe, said pipe coupling being connected to said pipe in a fluid-tight manner, said assembly comprising:

said pipe having an end with an outer surface, and an annular groove in said outer surface;

said groove having a bottom and a side, said bottom and said side being disposed to form a corner therebetween;

a tubular casing a tubular sealing sleeve disposed within the casing;

tensioning means for tightening said casing about said sealing sleeve when said sealing sleeve is disposed around the pipe;

a frusto-conical gripping ring located within said tubular casing at an end of said sealing sleeve so that tightening the tensioning means causes the sealing sleeve to be pressed into sealing engagement with the end of said pipe;

said tubular casing having a tubular web portion and a radially inwardly projecting flange at an end of the web portion, said flange and said tubular web portion being disposed to form a corner therebetween;

said gripping ring having an inner edge and an outer edge, the outer edge of the gripping ring making contact with said corner formed between the flange and said tubular web portion of the tubular casing, the inner edge of the gripping ring being plain and smooth and being in contact with the groove, said gripping ring being compressed between said corner formed in the tubular casing and said corner formed between the bottom of the groove and the side of the groove when the assembly is under axial tension.

19. The assembly according to claim 18 wherein said pipe comprises a plastic material.

\* \* \* \* \*

UNITED STATES PATENT AND TRADEMARK OFFICE
CERTIFICATE OF CORRECTION

PATENT NO. : 5 772 257
DATED : June 30, 1998
INVENTOR(S) : Ian R. Webb et al

It is certified that error appears in the above-identified patent and that said Letters Patent is hereby corrected as shown below:

Column 6, line 48; delete "the".
Column 7, line 19; replace "protecting"
with ---projecting---.
Column 8, line 63; replace "protecting"
with ---projecting---.
Column 9, line 10; replace "a" (second occurrence)
with ---;---.
line 11; before "tubular" insert ---a---.

Signed and Sealed this

Fifth Day of January, 1999

Attest:

Attesting Officer

*Acting Commissioner of Patents and Trademarks*